Figure 1:
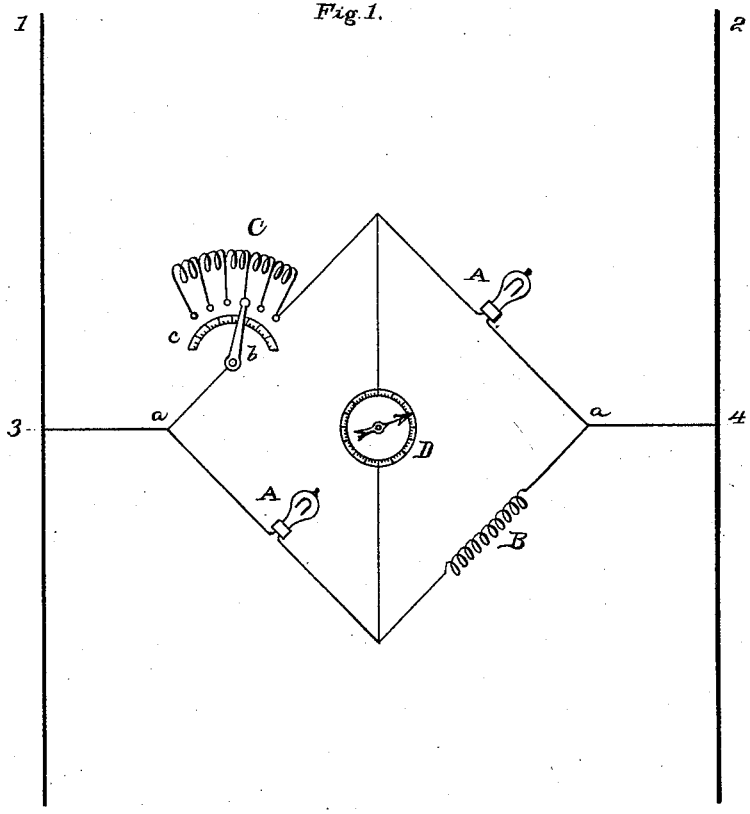

(No Model.) 2 Sheets—Sheet 1.

C. S. BRADLEY.
ELECTRICAL MEASURING APPARATUS.

No. 280,563. Patented July 3, 1883.

ATTEST:
E. C. Rowland
N. W. Seely

INVENTOR:
Charles S. Bradley
By Rich'd N. Dyer
Atty (No Model.) 2 Sheets—Sheet 2.

C. S. BRADLEY.
ELECTRICAL MEASURING APPARATUS.

No. 280,563. Patented July 3, 1883.

ATTEST:
E. C. Rowland
H. W. Seely

INVENTOR:
Charles S. Bradley
By Rich'd N. Dyer,
Atty

UNITED STATES PATENT OFFICE.

CHARLES S. BRADLEY, OF NEW YORK, N. Y., ASSIGNOR TO THE EDISON ELECTRIC LIGHT COMPANY, OF SAME PLACE.

ELECTRICAL MEASURING APPARATUS.

SPECIFICATION forming part of Letters Patent No. 280,563, dated July 3, 1883.

Application filed February 17, 1883. (No model.)

*To all whom it may concern:*

Be it known that I, CHARLES S. BRADLEY, of the city, county, and State of New York, have invented a certain new and useful Improvement in Electrical Measuring Apparatus, of which the following is a specification.

The object I have in view is to provide a simple and efficient method and apparatus by means of which the electro-motive force of the current of any electric circuit at any time may be readily determined.

Said invention is applicable to many uses, though I prefer to employ it in connection with the circuits of systems of electrical distribution for determining the electro-motive force in any part of the circuit at a given time, or as a permanent indicator at the central station of variations in electro-motive force, so that the generators may be regulated in accordance with its indications.

My invention is based upon the fact that in certain substances variations in temperature produce appreciable variations in electrical resistance. When such substance forms part of an electric circuit and the electro-motive force of the current in such circuit is varied, the temperature of such substance is varied, and consequently its electrical resistance changed. By noting these variations of resistance the electro-motive force of the current may be calculated.

In the apparatus which I have devised for practically carrying out my invention I employ the principle of the "Wheatstone Bridge." The circuit whose electro-motive force is to be noted has its terminals connected to opposite corners of a parallelogram of wires. In two opposite sides of the parallelogram are placed resistances formed of a substance whose coefficient of variation of resistance under varying temperatures is large. In the other two sides are placed resistances of a substance having little or no variation. Preferably these latter resistances have large radiating-surface. One of them is made adjustable, and a scale is provided for indicating the degree of adjustment. A galvanometer, or other instrument or device for indicating electric current, is connected to the other terminals of the parallelogram or bridge, as usual. The apparatus being thus connected in circuit a certain variation occurs in the sensitive resistances, according to the electro-motive force of the current, while the other resistances remain practically constant. This causes current to pass through the galvanometer, whose needle is deflected thereby. The adjustable resistance is then regulated until the needle resumes its position. The scale on the adjustable resistance is preferably marked in volts of electro-motive force, it being previously determined what degree of adjustment is equivalent to each volt, and the electro-motive force can therefore be read from the scale when the galvanometer-needle is balanced.

In using the apparatus as a permanent indicator the adjustable resistance would be set at the desired electro-motive force. Then as variations occur the galvanometer-needle will be deflected, and the generators will be regulated so as to increase or decrease the electro-motive force, as desired, the needle being kept as nearly as possible stationary by regulating the generators.

I prefer to employ for the sensitive resistances two incandescing electric lamps having carbon conductors. Such carbon conductors are very sensitive to changes of temperature, decreasing in resistance as the temperature increases, and being also small and compact are very suitable for the purpose. I may, however, employ resistances of a suitable metal. For the other resistances German-silver wire wound on small spools is very suitable, this metal not being materially affected by the variations. I may, however, employ a substance which is affected oppositely by changes in temperature to the sensitive resistance—that is, where carbon is employed as the sensitive resistances platinum may be used for the other resistances, which metal increases in resistance with increases of temperature. A double effect would thus be produced on the galvanometer. For convenience the apparatus may be inclosed in any suitable box or case with the scale exposed to view.

A modification of the arrangement described consists in placing a single sensitive resistance and a single constant or oppositely-varied but adjustable resistance in series and forming a shunt around each. A relay-magnet is provided, having two sets of coils wound to oppose each other, and each set is included in one of said shunts. The magnet is provided with a pivoted spring-retracted armature-lever normally held centrally between stops or contact-points by spring-fingers. As the sensitive resistance varies, more or less current passes through its shunt, and the armature-lever is drawn forward or back as the energy of the magnet increases or diminishes. Then by adjusting the adjustable resistance to the proper extent the armature is made to resume its central position, and the electro-motive force is determined by the extent of such adjustment, as before.

Figure 2:
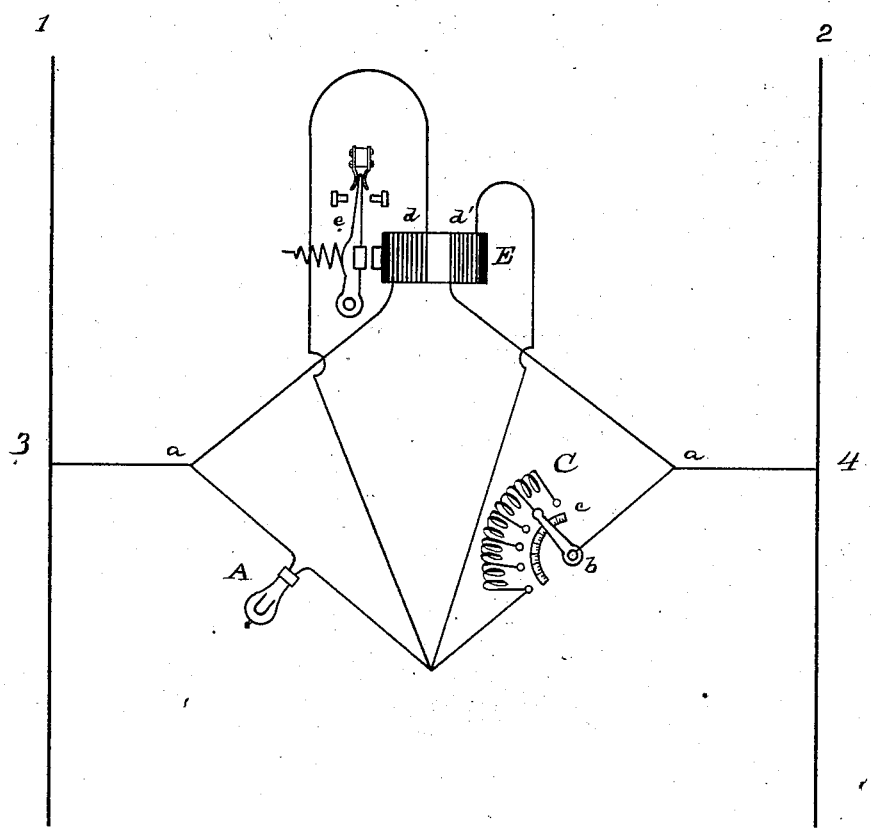

In the annexed drawings, Figure 1 is a diagram illustrating the preferred manner of accomplishing my invention, and Fig. 2 illustrates the modification described.

1 2 represent the conductors of a circuit whose electro-motive force is to be determined. Wires 3 4 from said circuit are connected to points $a$ $a$.

Referring to Fig. 1, A A are the incandescing electric lamps used as the sensitive resistances.

B is the constant resistance, and C the adjustable resistance, provided with an adjusting-arm, $b$, and a scale, $c$, for indicating the degree of adjustment.

D is the galvanometer. When the galvanometer-needle is deflected, the arm $b$ is moved until a balance is again effected, and the electro-motive force may then be determined.

In Fig. 2 a lamp, A, and the adjustable resistance C are in series, while a shunt around each includes a portion of the coils of the electro-magnet E, the current passing through the two portions in opposite directions. It is evident as the lamp A varies in resistance the current through the coils $d$ will be varied, while that through $d'$ remains constant. The armature-lever $e$ will thus be attracted or retracted from the central position in which it is normally held. The resistance C would then be adjusted until the armature returns to such central position, and the amount of adjustment noted.

It is evident that this apparatus could also be used as a permanent indicator, and, in addition, the movement of the armature-lever might be employed to control circuits for effecting an automatic regulation of the generators,

What I claim is—

1. The method of measuring the electro-motive force of an electric current, consisting in determining the change of resistance in a portion of the circuit when such current is passed through it, substantially as set forth.

2. The method of determining the electro-motive force of an electric current, consisting in noting the difference of resistance between a body sensitive to changes of temperature and a body whose resistance is practically constant under such changes when the current is passed through both of such bodies, substantially as set forth.

3. The combination of one or more resistances sensitive to changes of temperature, one or more resistances practically constant under such changes, all such resistances forming parts of a circuit, and means for indicating differences in resistance between said sensitive and said constant resistances, substantially as set forth.

4. The combination of resistances sensitive to changes of temperature forming opposite sides of a Wheatstone bridge, resistances practically constant under such changes forming the other two sides, means for indicating differences in resistance between said sensitive and said constant resistances, means for adjusting one of said constant resistances, and means for indicating the amount of such adjustment, substantially as set forth.

This specification signed and witnessed this 2d day of February, 1883.

CHARLES S. BRADLEY.

Witnesses:
H. W. SEELY,
EDWARD H. PYATT.